US012803456B2

(12) United States Patent
Pan et al.

(10) Patent No.: US 12,803,456 B2
(45) Date of Patent: Nov. 17, 2026

(54) SYSTEMS AND METHODS FOR ELECTRICAL ELEMENT FOR INVERTER FOR ELECTRIC VEHICLE

(71) Applicant: BorgWarner US Technologies LLC, Wilmington, DE (US)

(72) Inventors: Binghua Pan, Singapore (SG); Ing Looi Yap, Singapore (SG); Ling Eng Khoong, Singapore (SG)

(73) Assignee: BorgWarner US Technologies LLC, Wilmington, DE (US)

( * ) Notice: Subject to any disclaimer, the term of this patent is extended or adjusted under 35 U.S.C. 154(b) by 225 days.

(21) Appl. No.: 18/790,376

(22) Filed: Jul. 31, 2024

(65) Prior Publication Data

US 2026/0039216 A1 Feb. 5, 2026

(51) Int. Cl.
*H02M 7/00* (2006.01)
*B60L 15/00* (2006.01)

(52) U.S. Cl.
CPC ........... *H02M 7/003* (2013.01); *B60L 15/007* (2013.01); *B60L 2210/40* (2013.01)

(58) Field of Classification Search
CPC ..... H02M 7/003; H02M 7/537; B60L 15/007; B60L 2210/40; H01C 1/01; H01C 1/144; H01C 1/02; H01C 1/14; H01C 7/008; H01C 1/014
USPC .................................................. 318/139, 558
See application file for complete search history.

(56) References Cited

U.S. PATENT DOCUMENTS

| | | | | |
|---|---|---|---|---|
| 6,248,978 B1 | | 6/2001 | Okuda | |
| 7,709,922 B2 | * | 5/2010 | Takagi | H01C 7/008 257/467 |
| 8,084,812 B2 | * | 12/2011 | Kitamura | H10D 30/63 257/329 |
| 8,092,085 B2 | | 1/2012 | Kawase et al. | |
| 8,319,314 B2 | * | 11/2012 | Ogura | H10D 62/142 257/564 |
| 9,837,395 B2 | * | 12/2017 | Toyoda | H03K 17/102 |
| 11,600,411 B2 | | 3/2023 | Tonouchi | |
| 12,112,869 B2 | | 10/2024 | Sakakibara et al. | |
| 2010/0018222 A1 | | 1/2010 | Tsuchida et al. | |
| 2015/0245481 A1 | | 8/2015 | Brunner et al. | |
| 2017/0013718 A1 | | 1/2017 | Hattori et al. | |
| 2017/0253019 A1 | | 9/2017 | Hayashi et al. | |
| 2024/0312679 A1 | | 9/2024 | Tanaka | |
| 2024/0347237 A1 | | 10/2024 | Iguchi et al. | |
| 2026/0039216 A1 | | 2/2026 | Pan et al. | |

FOREIGN PATENT DOCUMENTS

| | | |
|---|---|---|
| JP | 4547781 B | 9/2010 |
| WO | 2024069438 A1 | 4/2024 |
| WO | 2025263274 A1 | 12/2025 |

* cited by examiner

*Primary Examiner* — David Luo
(74) *Attorney, Agent, or Firm* — Joshua M. Haines; Bookoff McAndrews, PLLC

(57) ABSTRACT

A system includes an inverter configured to convert DC power from a battery to AC power to drive a motor, wherein the inverter includes: a power module, the power module including a thermistor assembly, the thermistor assembly including: a conductive layer including a trench; a thermistor connected to the conductive layer and disposed across the trench; and a first height control feature between the conductive layer and the thermistor.

20 Claims, 7 Drawing Sheets

SYSTEMS AND METHODS FOR ELECTRICAL ELEMENT FOR INVERTER FOR ELECTRIC VEHICLE

TECHNICAL FIELD

Various embodiments of the present disclosure relate generally to a power module for an inverter for an electric vehicle, and more specifically, to a power module including an electrical element, such as a thermistor.

BACKGROUND

Inverters, such as those used to drive a motor in an electric vehicle, for example, are responsible for converting High Voltage Direct Current (HVDC) into Alternating Current (AC) to drive the motor. In an inverter, a power module may include electrical devices that are electrically connected to a substrate. A fault in the electrical connection of the electrical device may compromise the operation of the inverter.

The present disclosure is directed to overcoming one or more of these above-referenced challenges.

SUMMARY OF THE DISCLOSURE

In some aspects, the techniques described herein relate to a system including an inverter configured to convert DC power from a battery to AC power to drive a motor, wherein the inverter includes: a power module, the power module including a thermistor assembly, the thermistor assembly including: a conductive layer including a trench; a thermistor connected to the conductive layer and disposed across the trench; and a first height control feature between the conductive layer and the thermistor.

In some aspects, the techniques described herein relate to a system, wherein the thermistor assembly further includes: a solder layer between the conductive layer and the thermistor.

In some aspects, the techniques described herein relate to a system, wherein the thermistor assembly further includes: a trench filling material in the trench.

In some aspects, the techniques described herein relate to a system, wherein the first height control feature and the trench filling material include a same material.

In some aspects, the techniques described herein relate to a system, wherein the first height control feature has a rounded shape.

In some aspects, the techniques described herein relate to a system, wherein the first height control feature has a rectangle shape.

In some aspects, the techniques described herein relate to a system, wherein the thermistor assembly further includes: a second height control feature between the conductive layer and the thermistor.

In some aspects, the techniques described herein relate to a system, wherein the first height control feature and the second height control feature are a same size.

In some aspects, the techniques described herein relate to a system, wherein the conductive layer includes copper and the solder layer includes one or more of a solder paste or a solder preform.

In some aspects, the techniques described herein relate to a system, wherein the solder layer is printed on the conductive layer.

In some aspects, the techniques described herein relate to a system, further including: the battery configured to supply the DC power to the inverter; and the motor configured to receive the AC power from the inverter to drive the motor, wherein the system is provided as a vehicle including the inverter, the battery, and the motor.

In some aspects, the techniques described herein relate to a system including a thermistor assembly, the thermistor assembly including: a conductive layer including a trench; a thermistor connected to the conductive layer and disposed across the trench; and a height control feature between the conductive layer and the thermistor.

In some aspects, the techniques described herein relate to a thermistor assembly, further including: a solder layer between the conductive layer and the thermistor, wherein the height control feature is configured to maintain a distance between the conductive layer and the thermistor and thereby maintain a thickness of the solder layer.

In some aspects, the techniques described herein relate to a thermistor assembly, further including: a trench filling material disposed in the trench to prevent the solder layer from flowing into the trench.

In some aspects, the techniques described herein relate to a thermistor assembly, further including: an underfill material between the trench filling material in the trench and the thermistor.

In some aspects, the techniques described herein relate to a system including: a conductive layer having a first portion separated from a second portion; one or more first height control features disposed on the first portion of the conductive layer; one or more second height control features disposed on the second portion of the conductive layer; and an electrical component having a first portion disposed on the one or more first height control features and a second portion disposed on the one or more second height control features.

In some aspects, the techniques described herein relate to a system, further including: a solder material between the first portion of the conductive layer and the first portion of the electrical component.

In some aspects, the techniques described herein relate to a system, wherein the first portion of the electrical component and the second portion of the electrical component are separated by a trench.

In some aspects, the techniques described herein relate to a system, further including: a trench filling material between the first portion of the electrical component and the second portion of the electrical component.

In some aspects, the techniques described herein relate to a system, further including: an insulating layer, wherein the trench filling material is disposed on the insulating layer.

In some aspects, the techniques described herein relate to a system including an inverter configured to convert DC power from a battery to AC power to drive a motor, wherein the inverter includes: a power module, the power module including a thermistor assembly, the thermistor assembly including: a ceramic substrate; a thermistor element on the ceramic substrate; a protective coating disposed on the thermistor element so that the thermistor element is between the protective coating and the ceramic substrate; and a terminal electrode on the ceramic substrate, wherein an angle between a surface of the terminal electrode facing the protective coating and a surface of the protective coating facing the terminal electrode is greater than 90 degrees.

In some aspects, the techniques described herein relate to a system, wherein the thermistor assembly further includes: a conductive layer; and a solder layer between the conductive layer and the terminal electrode.

In some aspects, the techniques described herein relate to a system, wherein the conductive layer includes copper.

In some aspects, the techniques described herein relate to a system, wherein a portion of the terminal electrode overlaps a portion of the protective coating so that the portion of the protective coating is between the portion of the terminal electrode and the ceramic substrate.

In some aspects, the techniques described herein relate to a system, wherein a portion of the protective coating overlaps a portion of the terminal electrode so that the portion of the terminal electrode is between the portion of the protective coating and the ceramic substrate.

In some aspects, the techniques described herein relate to a system, wherein the protective coating and the terminal electrode do not overlap on the ceramic substrate.

In some aspects, the techniques described herein relate to a system, further including: the battery configured to supply the DC power to the inverter; and the motor configured to receive the AC power from the inverter to drive the motor, wherein the system is provided as a vehicle including the inverter, the battery, and the motor.

In some aspects, the techniques described herein relate to a system including: a ceramic substrate; a terminal electrode on the ceramic substrate; an electrical element on the ceramic substrate; and a protective coating disposed on the electrical element so that the electrical element is between the protective coating and the ceramic substrate, wherein an angle between a surface of the protective coating facing the terminal electrode and a surface of the terminal electrode facing the protective coating is greater than 90 degrees.

In some aspects, the techniques described herein relate to a system, further including: a conductive layer having a first portion separated from a second portion; and a solder layer between the terminal electrode and the first portion of the conductive layer.

In some aspects, the techniques described herein relate to a system, wherein a portion of the terminal electrode overlaps a portion of the protective coating so that the portion of the protective coating is between the portion of the terminal electrode and the ceramic substrate.

In some aspects, the techniques described herein relate to a system, wherein a portion of the protective coating overlaps a portion of the terminal electrode so that the portion of the terminal electrode is between the portion of the protective coating and the ceramic substrate.

In some aspects, the techniques described herein relate to a system including a thermistor assembly, the thermistor assembly including: a ceramic substrate; a thermistor element on the ceramic substrate, a protective coating disposed on the thermistor element so that the thermistor element is between the protective coating and the ceramic substrate; and a first terminal electrode on the ceramic substrate, wherein an angle between a surface of the first terminal electrode facing the protective coating and a surface of the protective coating facing the first terminal electrode is greater than 90 degrees.

In some aspects, the techniques described herein relate to a system, further including: a conductive layer having a first portion separated from a second portion; and a first solder layer between the first portion of the conductive layer and the first terminal electrode.

In some aspects, the techniques described herein relate to a system, wherein the thermistor assembly further includes a second terminal electrode on the ceramic substrate, the second terminal electrode separated from the first terminal electrode by the protective coating.

In some aspects, the techniques described herein relate to a system, wherein the system further includes a second solder layer between the second portion of the conductive layer and the second terminal electrode.

In some aspects, the techniques described herein relate to a system, wherein a portion of the first terminal electrode overlaps a portion of the protective coating so that the portion of the protective coating is between the portion of the first terminal electrode and the ceramic substrate.

In some aspects, the techniques described herein relate to a system, wherein a portion of the protective coating overlaps a portion of the first terminal electrode so that the portion of the first terminal electrode is between the portion of the protective coating and the ceramic substrate.

In some aspects, the techniques described herein relate to a system, wherein the protective coating and the first terminal electrode do not overlap on the ceramic substrate.

In some aspects, the techniques described herein relate to a system, wherein a portion of the protective coating and a portion of the first terminal electrode connect at a connection interface.

In some aspects, the techniques described herein relate to a system, wherein the first terminal electrode includes a softened material.

In some aspects, the techniques described herein relate to a system including an inverter configured to convert DC power from a battery to AC power to drive a motor, wherein the inverter includes: a power module, the power module including a thermistor assembly, the thermistor assembly including: a ceramic substrate; a thermistor element on the ceramic substrate; a protective coating disposed on the thermistor element so that the thermistor element is between the protective coating and the ceramic substrate; and a terminal electrode on the ceramic substrate, wherein an angle between a surface of the terminal electrode facing the protective coating and a surface of the protective coating facing the terminal electrode is greater than 90 degrees.

In some aspects, the techniques described herein relate to a system, wherein the thermistor assembly further includes: a conductive layer; and a solder layer between the conductive layer and the terminal electrode.

In some aspects, the techniques described herein relate to a system, wherein the conductive layer includes copper.

In some aspects, the techniques described herein relate to a system, wherein a portion of the terminal electrode overlaps a portion of the protective coating so that the portion of the protective coating is between the portion of the terminal electrode and the ceramic substrate.

In some aspects, the techniques described herein relate to a system, wherein a portion of the protective coating overlaps a portion of the terminal electrode so that the portion of the terminal electrode is between the portion of the protective coating and the ceramic substrate.

In some aspects, the techniques described herein relate to a system, wherein the protective coating and the terminal electrode do not overlap on the ceramic substrate.

In some aspects, the techniques described herein relate to a system, further including: the battery configured to supply the DC power to the inverter; and the motor configured to receive the AC power from the inverter to drive the motor, wherein the system is provided as a vehicle including the inverter, the battery, and the motor.

In some aspects, the techniques described herein relate to a system including: a ceramic substrate; a terminal electrode on the ceramic substrate; an electrical element on the ceramic substrate; and a protective coating disposed on the electrical element so that the electrical element is between the protective coating and the ceramic substrate, wherein an angle between a surface of the protective coating facing the terminal electrode and a surface of the terminal electrode facing the protective coating is greater than 90 degrees.

In some aspects, the techniques described herein relate to a system, further including: a conductive layer having a first portion separated from a second portion; and a solder layer between the terminal electrode and the first portion of the conductive layer.

In some aspects, the techniques described herein relate to a system, wherein a portion of the terminal electrode overlaps a portion of the protective coating so that the portion of the protective coating is between the portion of the terminal electrode and the ceramic substrate.

In some aspects, the techniques described herein relate to a system, wherein a portion of the protective coating overlaps a portion of the terminal electrode so that the portion of the terminal electrode is between the portion of the protective coating and the ceramic substrate.

In some aspects, the techniques described herein relate to a system including a thermistor assembly, the thermistor assembly including: a ceramic substrate; a thermistor element on the ceramic substrate, a protective coating disposed on the thermistor element so that the thermistor element is between the protective coating and the ceramic substrate; and a first terminal electrode on the ceramic substrate, wherein an angle between a surface of the first terminal electrode facing the protective coating and a surface of the protective coating facing the first terminal electrode is greater than 90 degrees.

In some aspects, the techniques described herein relate to a system, further including: a conductive layer having a first portion separated from a second portion; and a first solder layer between the first portion of the conductive layer and the first terminal electrode.

In some aspects, the techniques described herein relate to a system, wherein the thermistor assembly further includes a second terminal electrode on the ceramic substrate, the second terminal electrode separated from the first terminal electrode by the protective coating.

In some aspects, the techniques described herein relate to a system, wherein the system further includes a second solder layer between the second portion of the conductive layer and the second terminal electrode.

In some aspects, the techniques described herein relate to a system, wherein a portion of the first terminal electrode overlaps a portion of the protective coating so that the portion of the protective coating is between the portion of the first terminal electrode and the ceramic substrate.

In some aspects, the techniques described herein relate to a system, wherein a portion of the protective coating overlaps a portion of the first terminal electrode so that the portion of the first terminal electrode is between the portion of the protective coating and the ceramic substrate.

In some aspects, the techniques described herein relate to a system, wherein the protective coating and the first terminal electrode do not overlap on the ceramic substrate.

In some aspects, the techniques described herein relate to a system, wherein a portion of the protective coating and a portion of the first terminal electrode connect at a connection interface.

In some aspects, the techniques described herein relate to a system, wherein the first terminal electrode includes a softened material.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
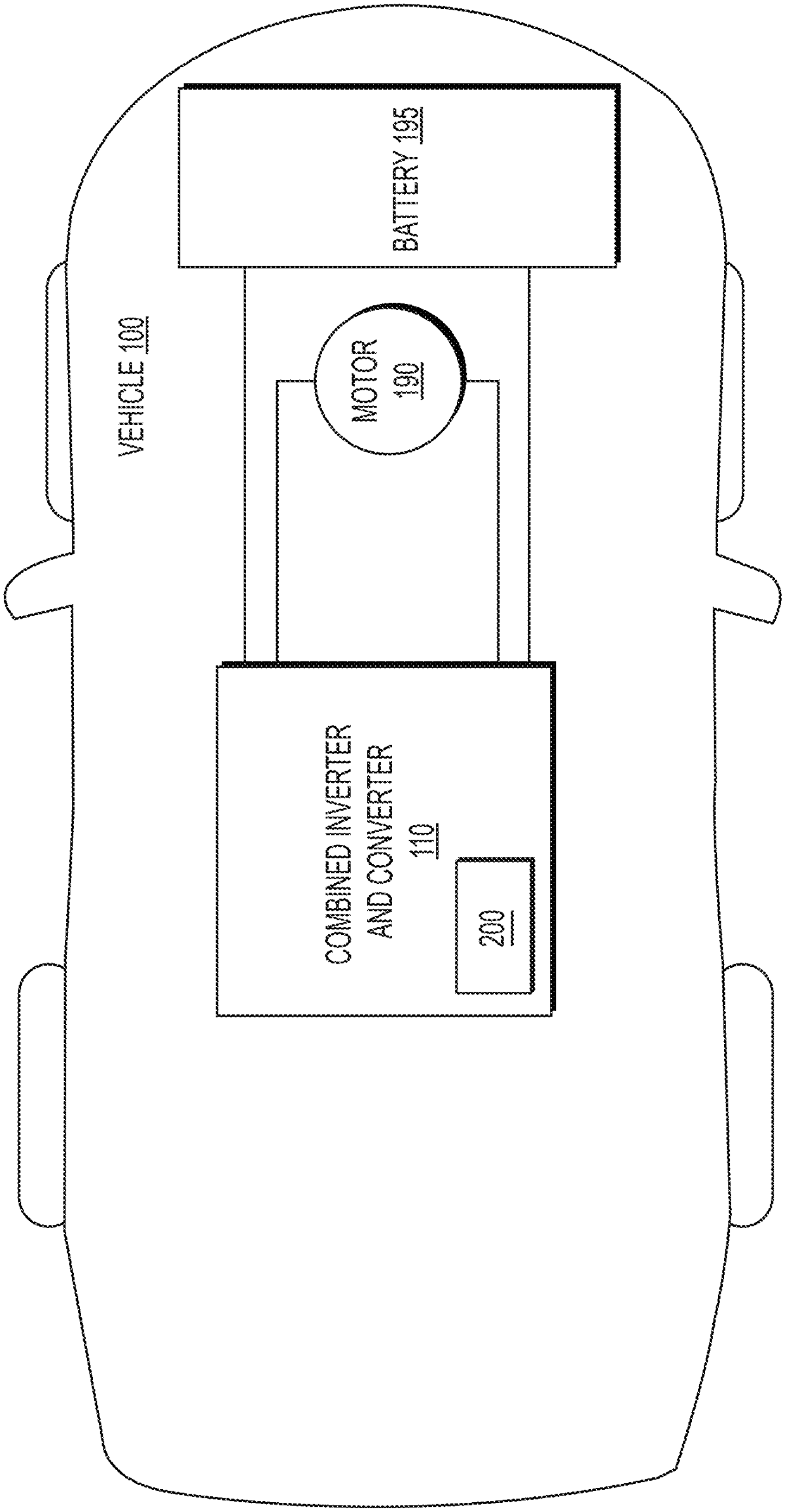
FIG. 1 depicts an exemplary system infrastructure for a vehicle including a combined inverter and converter, according to one or more embodiments.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of ±10% in the stated value.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Various embodiments of the present disclosure relate generally to systems and methods for a power module for an inverter for an electric vehicle, and more specifically, to a power module including a including an electrical element, such as a thermistor.

Some systems for heat generation or high power integrated circuit packages are assembled to a heat exchanger, a heatsink, or a cold trail using a thermal interface material with a single or double side cooling thermal system. Some systems use a thermistor, which faces high failure rate during reliability testing, such as thermal shock testing or thermal cycling testing, for example. In some systems, the main failure modes include thermistor element cracking and ceramic body termination interface separation, as well as typical solder fatigue and through cracking in solder joints of thermistor terminals to substrate pads. In some systems, a thermistor is assembled on a base substrate close to one of the dies. Some systems include a thermistor cut-out on a cap substrate to ensure that thermistors are not in contact with the surface of the cap substrate.

In some systems, the thermistor is fully encapsulated by an underfill or a plotting gel, except the solder joints below two terminals. In some systems, thermistor solder thickness is increased by printing more solder paste on thermistor pads. In some systems, this increases the solder thickness significantly. However, it is not effective in all systems because increased solder may just move to form a solder fillet, instead of increasing solder thickness below thermistor terminals. In some systems, the trench filling material height is optimized and reduced to ensure it is to be lower than copper pad surfaces. However, a failure analysis of these systems indicates that trench filling material may be higher than copper pad surfaces at some points. This may lead to the trench filling material pushing solder on the thermistor, which might cause solder failure of thermistors.

According to one or more embodiments, a thermistor may feature one or more height control features on copper pads for that serve to connect thermistor terminals on a conductive layer with a controlled height. Height control features may include a solder mask, solder paste, a solder preform, a legend ink, a dot adhesive, or a glue that may be applied with well-controlled height. The height control features may be electrically conductive or non-conductive. The height control features may be the same material as the conductive layer. The height control features may not hinder solder paste printing, and solder paste may be printed onto the height control features.

According to one or more embodiments, the height control features may be applied, the solder layer may be printed, the thermistor may be placed, and the solder layer may be reflowed. Height control features may be placed before the thermistor is placed on the solder layer, and the thermistor may be placed on the solder layer and the solder layer reflowed to achieve an increased solder thickness. An increase in solder thickness may increase the thermistor reliability.

According to one or more embodiments, the conductive layer may include copper. The conductive layer may include silver. The conductive layer may comprise a first portion and a second portion. The first portion of the conductive layer may be placed approximately 0.7 mm from the second portion of the conductive layer. However, the disclosure is not limited thereto. For example, the first portion of the conductive layer may be spaced from the second portion of the conductive layer according to one or more of a component type or size, such as 0402, 0603, or 1208, for example. The spacing may vary based on a manufacturing processing modification, for example. The first portion of the conductive layer and the second portion of the conductive layer may be separated by underfill. Underfill may possess a high coefficient of thermal expansion, for example, from approximately 315 to approximately 320). The continuous expansion and contraction of underfill imposes stress on the thermistor during thermal shock or thermal cycle testing. During thermal shock or thermal cycle testing, the thermistor is prone to fail due to extreme continuous pulling and pushing by underfill surrounding the thermistor as the underfill expands and contracts. The modification of the solder layer and the terminal electrodes of the thermistor may improve thermistor reliability performance during thermal shock testing. The terminal electrode may have a solid structure. The terminal electrode may have a softened structure to improve thermistor testing reliability. An increased solder thickness may survive longer cycles of testing with stress imposed on solder joints due to a difference in the co-efficient of thermal expansion between the thermistor and the substrate.

According to one or more embodiments, the conductive layer includes two mounting pads. The mounting pads may include copper or aluminum, for example. The mounting pads may be disposed on a base substrate to allow the thermistor to be attached to the base substrate. The base substrate may include the insulating layer. The mounting pads may be spaced to match a mounting component on a thermistor, for example, the thermistor terminals. The mounting component of the thermistor may include silver or copper to facilitate the connection of the thermistor to the base substrate. The mounting pads may be spaced by a distance that is larger than required to accommodate physical limitations, such as a layer of copper that is thicker than desired or limited substrate fabrication capabilities. The mounting pads may be spaced by a distance that is configured to support the electrical component.

FIG. 1 depicts an exemplary system infrastructure for an electric vehicle including a combined inverter and converter, according to one or more embodiments. In the context of this disclosure, the combined inverter and converter may be referred to as an inverter. As shown in FIG. 1, electric vehicle 100 may include an inverter 110, a motor 190, and a battery 195. The inverter 110 may include components to receive electrical power from an external source and output electrical power to charge battery 195 of electric vehicle 100. The inverter 110 may convert DC power from battery 195 in electric vehicle 100 to AC power, to drive motor 190 of the electric vehicle 100, for example, but the embodiments are not limited thereto. The inverter 110 may be bidirectional, and may convert DC power to AC power, or convert AC power to DC power, such as during regenerative braking, for example. Inverter 110 may be a three-phase inverter, a single-phase inverter, or a multi-phase inverter. The inverter may include a power module 200.

Figure 2:
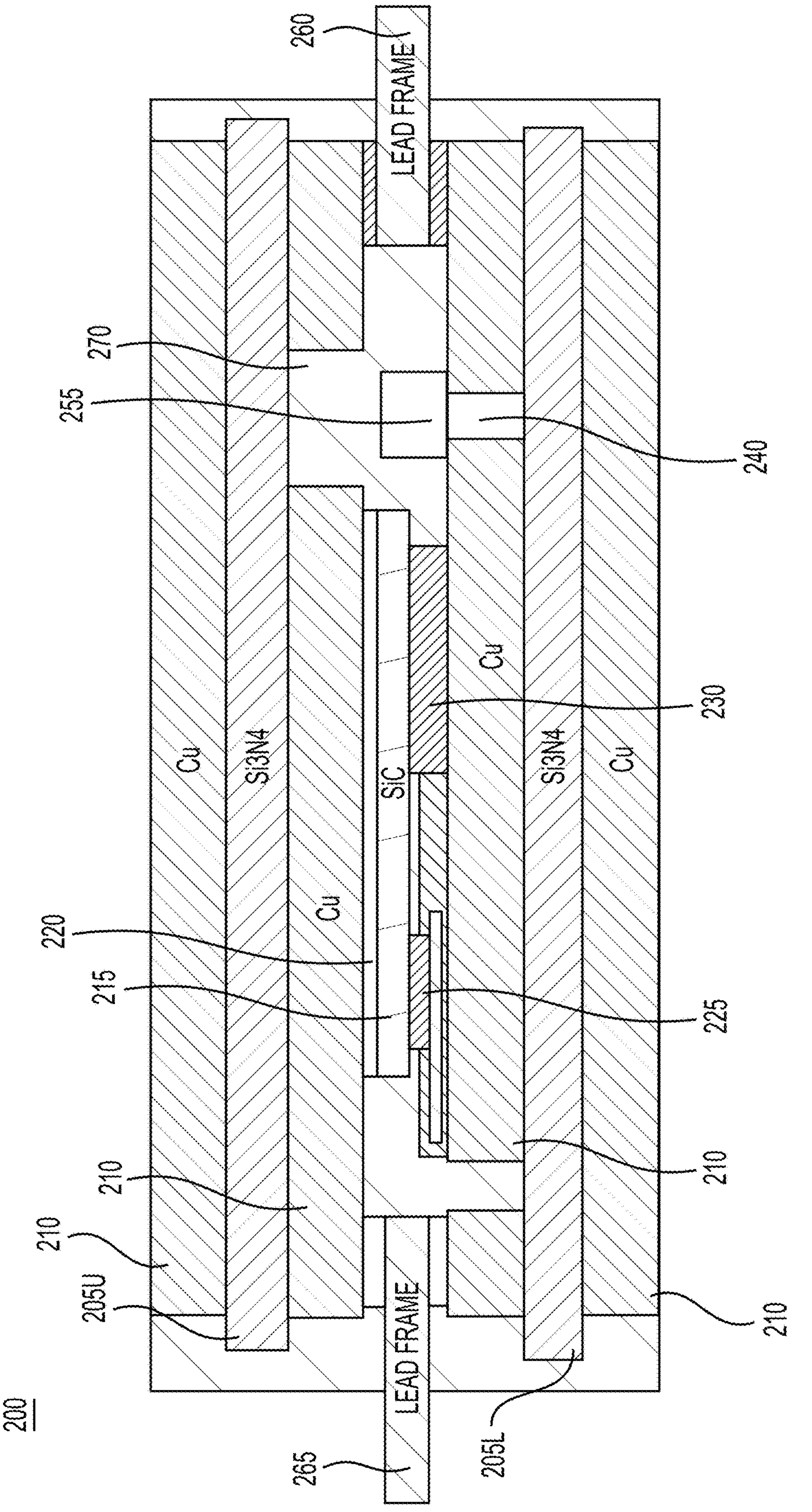
FIG. 2 depicts a cross-section view of a power module including a thermistor assembly, according to one or more embodiments.

FIG. 2 depicts a cross-section view of a power module 200 including a thermistor assembly 300, according to one or more embodiments. Dual-side-cooled power module 200 according to one or more embodiments may include upper substrate 205U and lower substrate 205L, both of ceramic, e.g., silicon nitride ($Si_3N_4$) having thick metallization, e.g., direct bond copper (DBC) or active metal brazing (AMB). Lower substrate 205L may be an insulating layer. The dual-side-cooled power module 200 may further include a die 215 that may have a drain connection 220 to upper substrate 205U. The source connection 230 may, as shown in FIG. 2, be attached to the lower substrate 205L. A circuit may provide an interconnect to the gate 225 of the die 215. The dual-side-cooled power module may further include first lead frame connection 260 for the drain (on upper substrate 205U) and second lead frame connection 265 for the source (on lower substrate 205L). The assembly may be filled with an underfill or potting gel or over-molded with a dielectric material 270. The first lead frame connection 260 may be sintered, soldered, or ultrasonically welded to dual-side-cooled power module 200. Power module 200 may include first lead frame connection 260 for the positive supply voltage (from battery 195, for example), or for the negative supply voltage.

Figure 3:
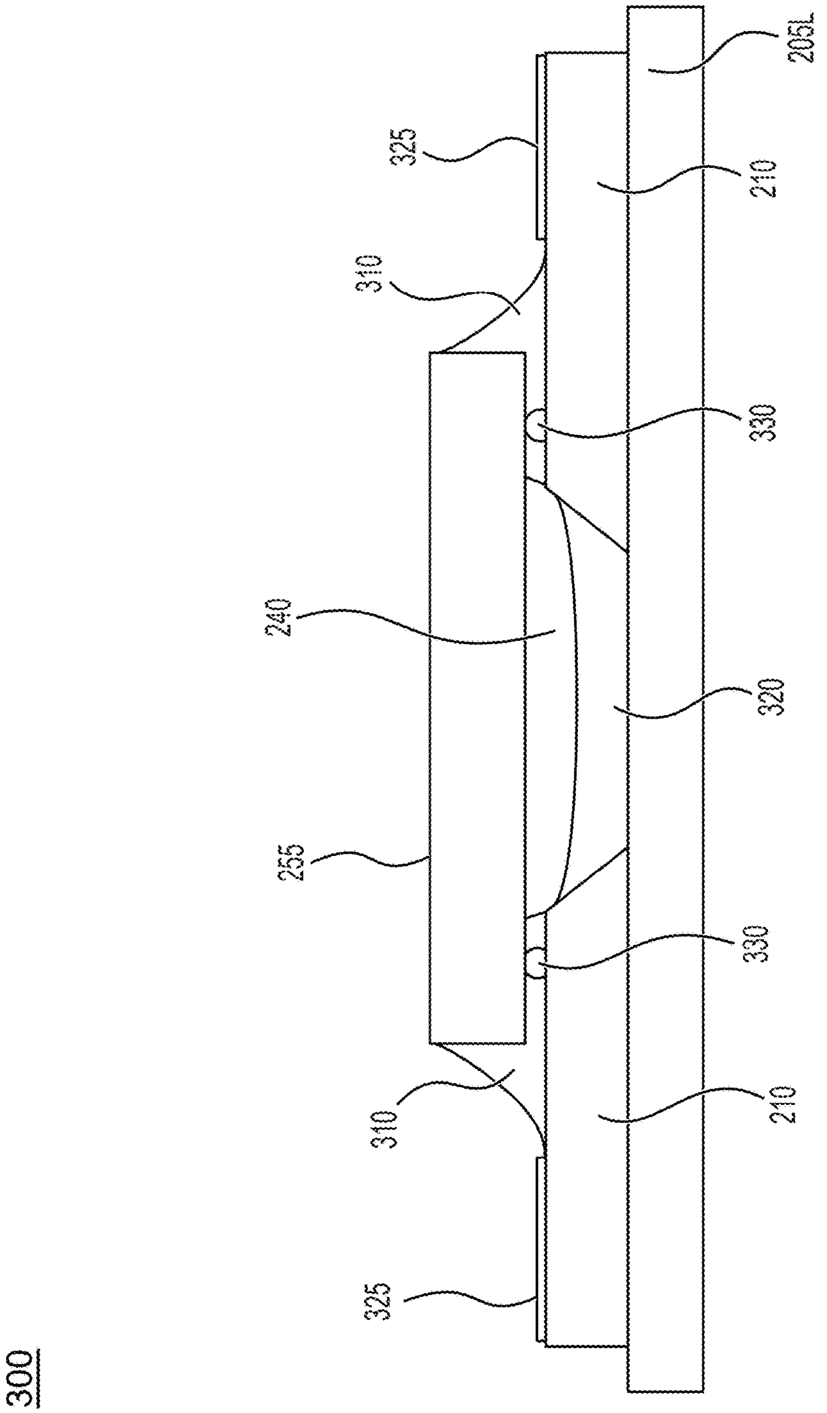
FIG. 3 depicts a cross-section view of a thermistor assembly, according to one or more embodiments.

FIG. 3 depicts a cross-section view of a thermistor assembly 300, according to one or more embodiments. Thermistor assembly 300 may include conductive layer 210, thermistor 255, and height control feature 330. Thermistor assembly 300 may include solder layer 310 between thermistor 255 and conductive layer 210. Thermistor 255 may be connected to solder layer 310. Solder layer 310 may include a first portion separated from a second portion. Solder layer 310 may include one or more of a solder paste or a solder preform. Conductive layer 210 may include a first portion separated from a second portion. For example, first portion of conductive layer 210 may be separated from a second portion of conductive layer 210 by a trench. Conductive layer 210 may include copper, for example. Thermistor 255 may include a first terminal electrode connected to the first portion and a second terminal electrode connected to the second portion by solder layer 310.

Height control feature 330 may be disposed between conductive layer 210 and thermistor 255. Height control feature 330 may include a first height control feature and a second height control feature. The first height control feature and the second height control feature of height control feature 330 may have the same size, such as a same height to prevent tilting of the thermistor 255. Height control feature 330 may have a round shape, for example. Height control feature 330 may have a rectangle shape, for example. Height control feature 330 may be disposed on conductive layer 210 on a on both sides of the trench. Thermistor assembly 300 may include trench fill 320 disposed in the trench. Underfill 240 may be flow into a gap in the trench between trench fill 320 and thermistor 255. Thermistor assembly 300 may include, or may be disposed on, upper substrate 205U or lower substrate 205L. Trench fill 320 may be disposed between underfill 240 and lower substrate 205L to fill the trench to a required height below the thermistor 255. Conductive layer 210 may be disposed on lower substrate 205L. Lower substrate 205L may be an insulating layer.

Figure 4:
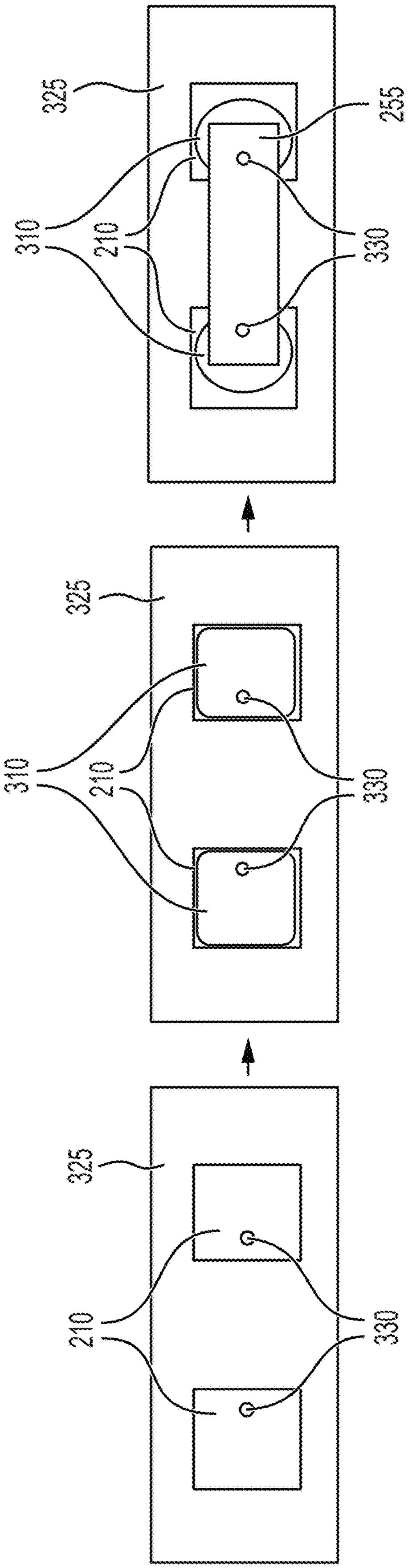
FIG. 4 depicts a top view of an assembly of a thermistor assembly, according to one or more embodiments.

FIG. 4 depicts a top view of an assembly of a thermistor assembly 300, according to one or more embodiments. Thermistor 255 may be disposed on height control feature 330. Height control feature 330 may include a first height control feature and a second height control feature. Height control feature 330 may be disposed on solder layer 310. Solder layer 310 may include a first portion and a second portion. Solder layer 310 may be disposed on conductive layer 210. Conductive layer 210 may include a first portion and a second portion. The first portion of solder layer 310 may be disposed on the first portion of conductive layer 210. The second portion of solder layer 310 may be disposed on the second portion of conductive layer 210. For example, the first portion of conductive layer 210 and the second portion of conductive layer 210 may be separated by a trench. Trench fill 320 may be disposed on conductive layer 210. Trench fill 320 may be disposed in the trench on conductive layer 210 between the first portion of conductive layer 210 and the second portion of conductive layer 210. Solder layer 310 may be applied over height control feature 330 on conductive layer 210. After reflow, a height or thickness of solder layer 310 may be controlled by a height of height control feature 330.

Figure 5:
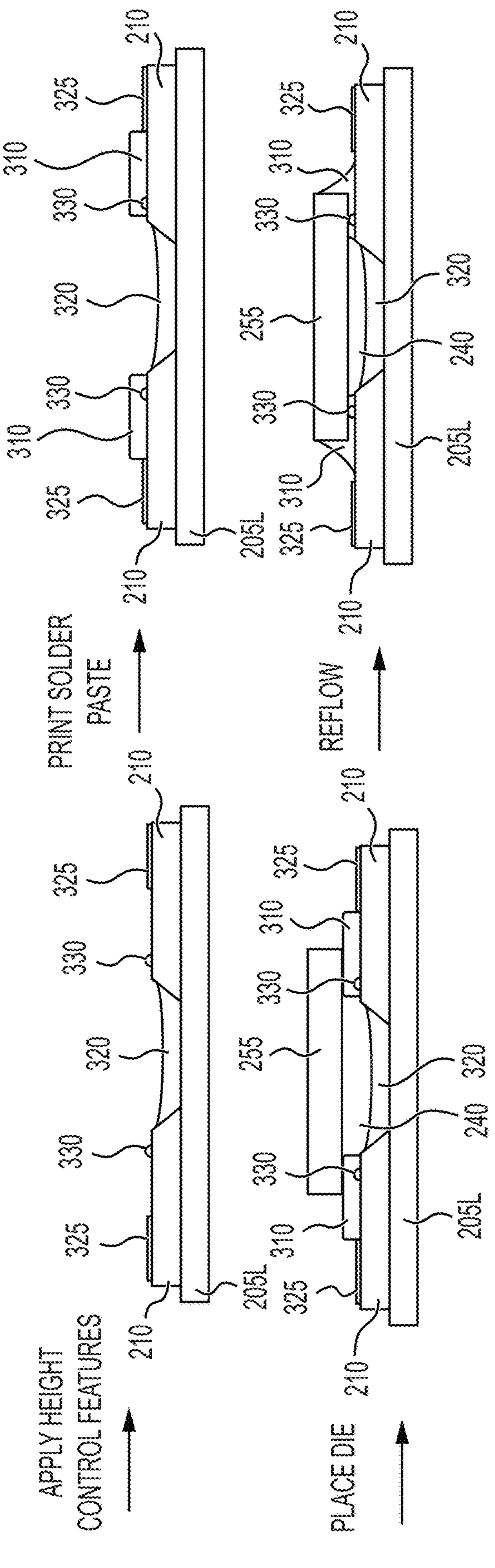
FIG. 5 depicts a side view of an assembly of a thermistor assembly, according to one or more embodiments.

FIG. 5 depicts a side view of and assembly of a thermistor assembly 300, according to one or more embodiments. Lower substrate 205L may be disposed on a surface of conductive layer 210 opposite to solder layer 310. Conductive layer 210 may include a first portion and a second portion. For example, the first portion of conductive layer 210 may be disposed on a first side of a trench and the second portion of conductive layer 210 may be disposed on a second side of a trench. The first portion of conductive layer 210 and the second portion of conductive layer 210 may correspond to respective solder pads for corresponding terminal electrodes of thermistor 255. Trench fill 320 may be disposed on conductive layer 210. Trench fill 320 may be disposed on conductive layer 210 between the first portion of conductive layer 210 and the second portion of conductive layer 210. A material of trench fill 320 may be the same as a material of height control feature 330.

Height control feature 330 may be disposed on conductive layer 210. Height control feature 330 may include a first height control feature and a second height control feature, for example. Height control feature 330 may be disposed on solder layer 310. Solder layer 310 may be disposed on conductive layer 210. Height control feature 330 may be disposed between conductive layer 210 and thermistor 255. Solder layer 310 may be disposed on height control feature 330. Solder layer 310 may be disposed between height control feature 330 and thermistor 255. Thermistor 255 may be disposed on height control feature 330. Height control feature 330 may maintain a separation distance between thermistor 255 and conductive layer 210. A solder material, such as a paste or preform, may be applied on conductive layer 210, and may cover height control feature 330. After reflow of the solder material, a solder height or distance between two terminals of thermistor 255 and conductive layer 210 may be controlled by a height of the height control feature 330. After reflow, the solder material will form solder layer 310.

Figure 6A:
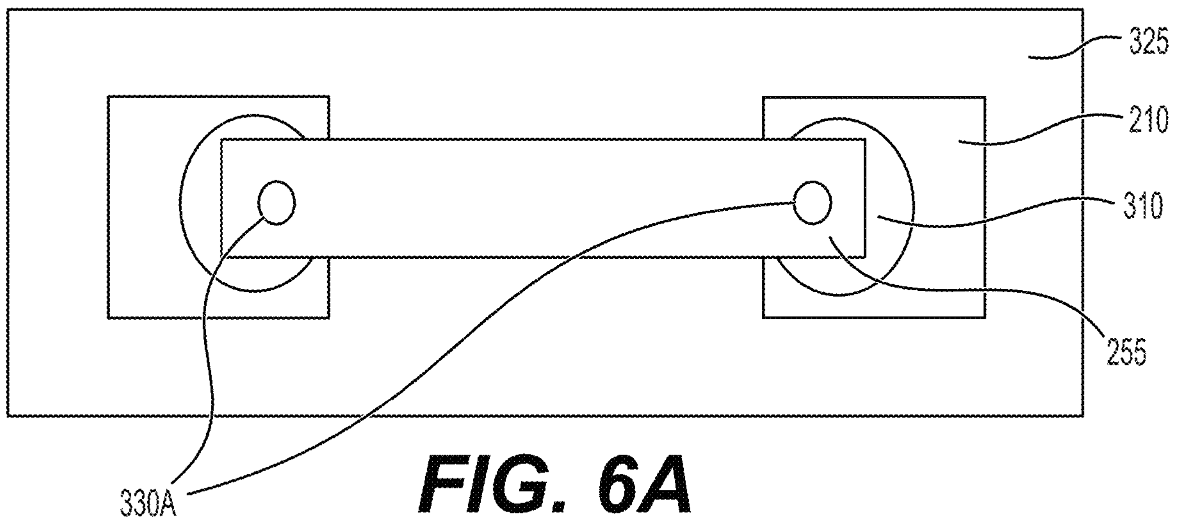
FIG. 6A, FIG. 6B, and FIG. 6C depict electrical components including height control features, according to one or more embodiments.
Figure 6B:
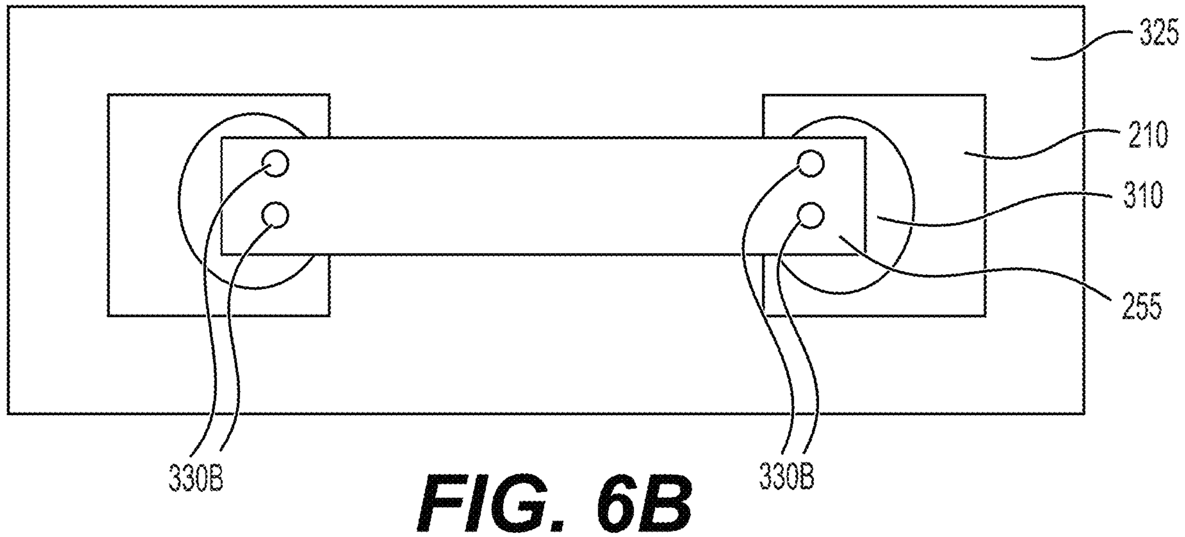
Figure 6C:
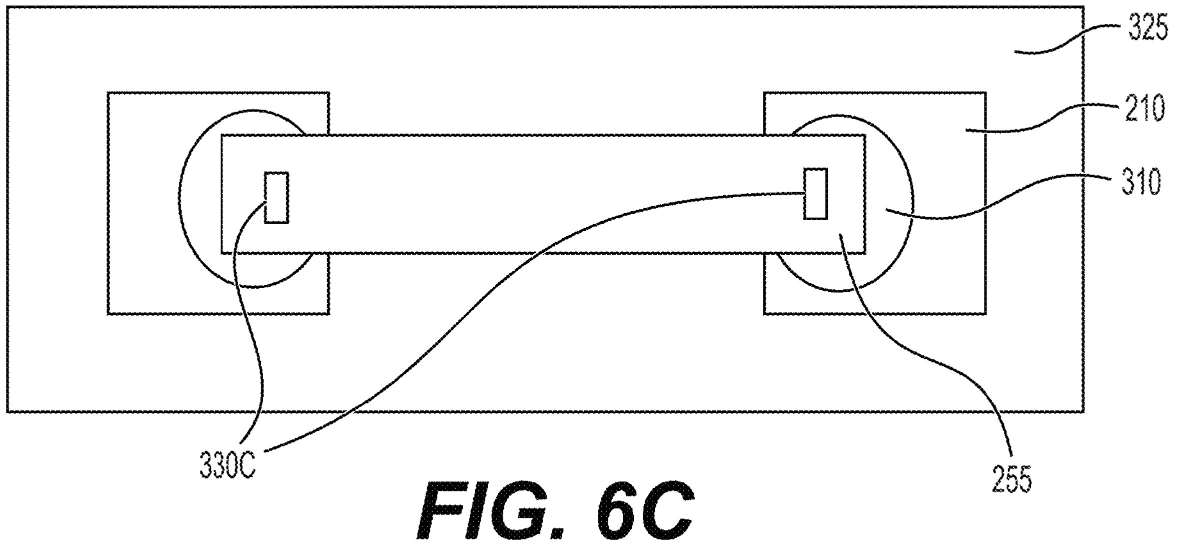

FIG. 6A, FIG. 6B, and FIG. 6C depict electrical components including height control features, according to one or more embodiments. Trench fill 320 may be disposed on conductive layer 210. Solder layer 325 may be disposed on conductive layer 210. Solder layer 325 may define pad openings for conductive layer 210. Height control feature 330 may be disposed on conductive layer 210. Height control feature 330 may include one or more height control features. Height control feature 330 may have a round shape. Height control feature 330 may include one or more pairs of height control features. Thermistor 255 may be disposed on height control feature 330.

As depicted in FIG. 6A, height control feature 330A may include a first single round height control feature in a first portion of solder layer 310 and a second single round height control feature in a second portion of solder layer 310. As depicted in FIG. 6B, height control feature 330B may include a first pair of round height control features in a first portion of solder layer 310 and a second pair of round height control features in a second portion of solder layer 310. As depicted in FIG. 6C, height control feature 330C may include a first single rectangular height control feature in a first portion of solder layer 310 and a second single rectangular height control feature in a second portion of solder layer 310. A height of height control feature 330 in a first portion of solder layer 310 and in a second portion of solder layer 310 may be equal to maintain a same solder height of terminals and prevent tilting of thermistor 255.

Figure 7A:
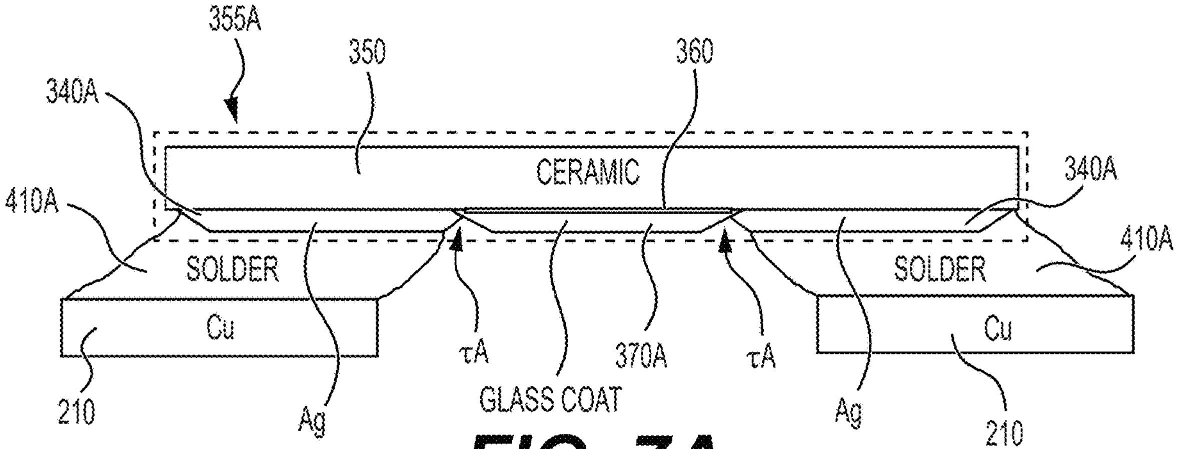
FIG. 7A, FIG. 7B, and FIG. 7C depict cross-section views of thermistor assemblies including a protective coating, according to one or more embodiments.
Figure 7B:
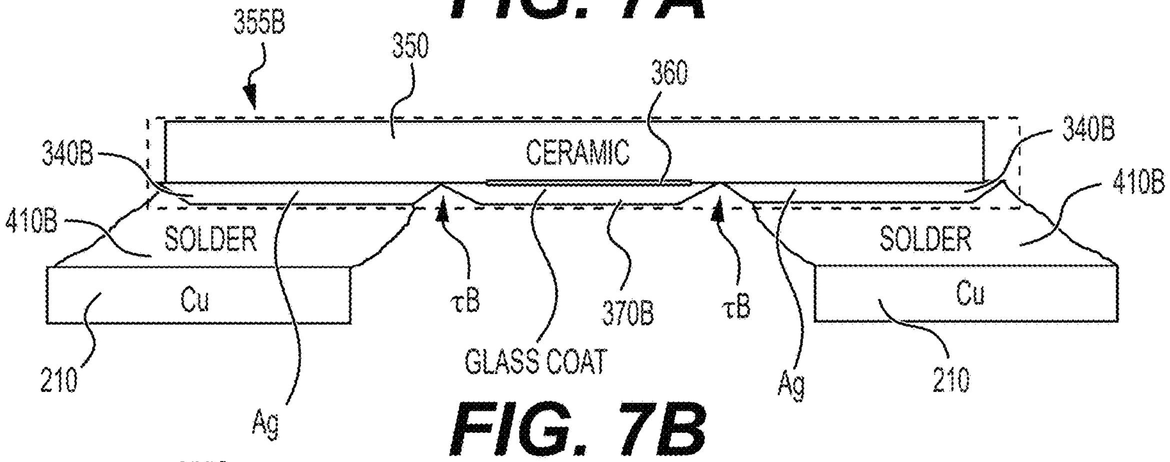
Figure 7C:
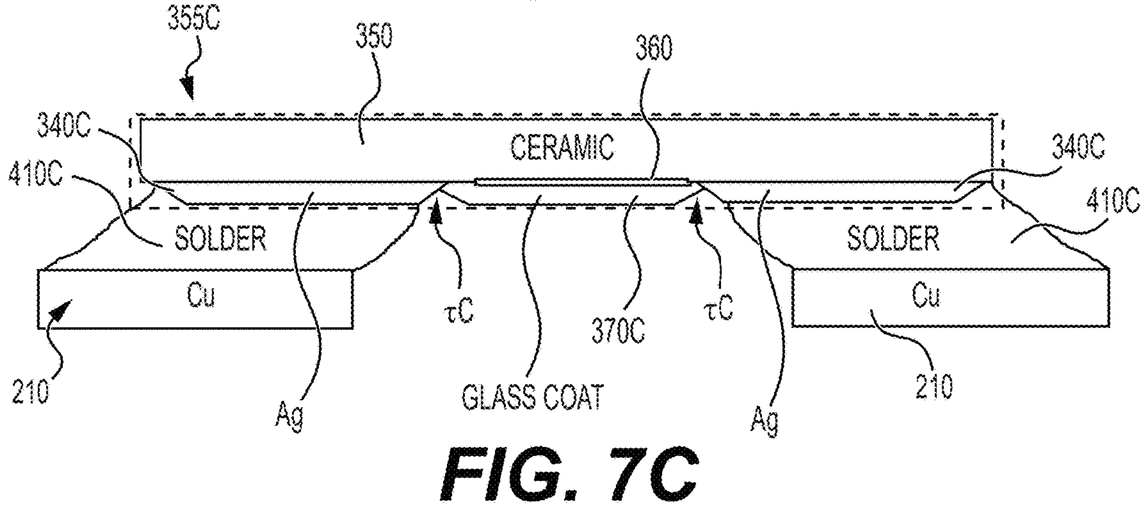

FIG. 7A, FIG. 7B, and FIG. 7C depict cross-section views of thermistor assemblies including a protective coating 370A, according to one or more embodiments. Protective coating 370A may include glass. Thermistor assembly 355A may include ceramic substrate 350, thermistor 360, protective coating 370A, and terminal electrode 340A. Thermistor 360 may be disposed on ceramic substrate 350. Protective coating 370A may be disposed on ceramic substrate 350. Thermistor 360 may be disposed between protective coating 370A and ceramic substrate 350. Terminal electrode 340A may be disposed on ceramic substrate 350. Terminal electrode 340A may include a first portion (i.e., a first terminal electrode) opposite a second portion (i.e., a second terminal electrode).

Terminal electrode 340A may include a surface facing protective coating 370A. Protective coating 370A may include a surface facing solder layer 410A. The surface of terminal electrode 340A facing protective coating 370A and the surface of protective coating 370A facing terminal electrode 340A may form angle τA. Angle τA may be greater than approximately 90 degrees, for example. Angle τA may be greater than approximately 110 degrees, for example. Angle τA may be greater than approximately 130 degrees, for example. Protective coating 370A may be applied prior to terminal electrode 340A. A shape of protective coating 370A may lead to the front end of protective coating 370A forming a shape with a bending curved angle that may be easier to oppose a pulling force from solder layer 410A. FIG. 7A depicts an end of terminal electrode 340A as a rounded, blunt, or obtuse shape, which follows the contour of solder layer 410A, which may increase a reliability of thermistor 255 relative to a terminal electrode 340A with a sharp end.

Terminal electrode 340A may be disposed on solder layer 410A. Solder layer 410A may include silver, for example. Solder layer 410A may include a first portion and a second portion. Solder layer 410A may be disposed on conductive layer 210. Conductive layer 210 may include a first portion and a second portion. Conductive layer 210 may include copper or aluminum, for example.

Thermistor assembly 355B may be similar to thermistor assembly 355A. However, as depicted in FIG. 7B, a surface of terminal electrode 340B facing protective coating 370B may contact the surface of protective coating 370B facing terminal electrode 340B. Thermistor assembly 355C may be similar to thermistor assembly 355A. However, as depicted in FIG. 7C, the surface of protective coating 370C facing terminal electrode 340C may overlap the surface of terminal electrode 340C facing protective coating 370C. As depicted in FIG. 7B, terminal electrode 340B may be separated from protective coating 370B, so that no overlap is formed between terminal electrode 340B and protective coating 370B. Thus, a front end of terminal electrode 340B may follow the contour of solder layer 410B, which may lead to much lower pulling stress from solder layer 410B. As depicted in FIG. 7C, terminal electrode 340C may be applied prior to protective coating 370C. Protective coating 370C may be applied over terminal electrode 340C, and therefore, a front end of terminal electrode 340C may be formed to follow a contour of solder layer 410C, which may reduce stress from pulling by solder layer 410C. A surface of protective coating 370C facing terminal electrode 340C may overlap the surface of terminal electrode 340C facing protective coating 370C, because terminal electrode 340C may be applied prior to protective coating 370C.

As depicted in FIG. 7A, terminal electrode 340A may include a first portion opposite to a second portion. Terminal electrode 340A may include a surface facing protective coating 370A. Protective coating 370A may include a surface facing terminal electrode 340A. The surface of terminal electrode 340A facing protective coating 370A may contact the surface of protective coating 370A facing terminal electrode 340A. The surface of terminal electrode 340A facing protective coating 370A may overlap the surface of protective coating 370A facing terminal electrode 340A. The surface of terminal electrode 340A facing protective coating 370A and the surface of protective coating 370A facing terminal electrode 340A may form angle τA. Angle τA may be greater than approximately 90 degrees, for example. Angle τA may be greater than approximately 110 degrees, for example. Angle τA may be greater than approximately 130 degrees, for example.

Protective coating 370A may be applied prior to terminal electrode 340A. A shape of protective coating 370A may lead to the front end of protective coating 370A forming a shape with a bending curved angle that may be easier to oppose a pulling force from solder layer 410A. FIG. 7A depicts an end of terminal electrode 340A as a rounded, blunt, or obtuse shape, which follows the contour of solder layer 410A, which may increase a reliability of thermistor 255 relative to a terminal electrode 340A with a sharp end. Terminal electrode 340A may overlap protective coating 370A because terminal electrode 340A may be applied before protective coating 370A.

As depicted in FIG. 7B, terminal electrode 340B may include a first portion opposite to a second portion. Terminal electrode 340B may be disposed on solder layer 410B. Terminal electrode 340B may include a surface facing protective coating 370B. Protective coating 370B may include glass. Protective coating 370B may include a surface facing terminal electrode 340B. As depicted in FIG. 7B, terminal electrode 340B may be separated from protective coating 370B, so that no overlap is formed between terminal electrode 340B and protective coating 370B. As depicted in FIG. 7B, the protective coating 370B and the terminal electrode 340B do not overlap. Thus, a front end of terminal electrode 340B may follow the contour of solder layer 410B, which may lead to much lower pulling stress from solder layer 410B. The surface of terminal electrode 340B facing protective coating 370B may contact (e.g., minimal contact with) the surface of protective coating 370B facing terminal electrode 340B. The surface of terminal electrode 340B facing protective coating 370B and the surface of protective coating 370B facing terminal electrode 340B may form angle τB. Angle τB may be greater than approximately 10 degrees, for example. Angle τB may be greater than approximately 50 degrees, for example. Angle τB may be greater than approximately 100 degrees, for example.

As depicted in FIG. 7C, terminal electrode 340C may include a first portion opposite to a second portion. Terminal electrode 340C may be disposed on solder layer 410C. Terminal electrode 340C may include a surface facing protective coating 370C. Protective coating 370C may include glass. Protective coating 370C may include a surface facing terminal electrode 340C. As depicted in FIG. 7C, terminal electrode 340C may be applied prior to protective coating 370C. Protective coating 370C may be applied over terminal electrode 340C, and therefore, a front end of terminal electrode 340C may be formed to follow a contour of solder layer 410C, which may reduce stress from pulling by solder layer 410C. A surface of protective coating 370C facing terminal electrode 340C may overlap the surface of terminal electrode 340C facing protective coating 370C, because terminal electrode 340C may be applied prior to protective coating 370C. The surface of terminal electrode 340C facing protective coating 370C may contact the surface of protective coating 370C facing terminal electrode 340C. The surface of protective coating 370C facing terminal electrode 340C may overlap the surface of terminal electrode 340C facing protective coating 370C. The surface of terminal electrode 340C facing protective 370C and the surface of protective coating 370C facing terminal electrode 340C may form angle τC. Angle τC may be greater than approximately 90 degrees, for example. Angle τC may be greater than approximately 110 degrees, for example. Angle τC may be greater than approximately 130 degrees, for example.

One or more embodiments may include a terminal electrode that is softened, due to material selection and/or material processing. Softening the terminal electrode may improve a reliability of thermistor 255.

According to one or more embodiments, a thermistor may feature one or more height control features on copper pads that serve to connect thermistor terminals. Height control features may include a solder mask, solder paste, a solder preform, a legend ink, a dot adhesive, or a glue. The height control features may be the same material as the conductive layer. The height control features may part of, or integrated with, the conductive layer. The height control features may each be applied with well-controlled height. The height control features may not hinder solder paste printing, and solder paste may be printed over the height control features.

According to one or more embodiments: the height control features may be applied, the solder layer may be printed, the thermistor may be placed, and the solder layer may be reflowed. Height control features may be placed before or after the thermistor is placed on the solder layer, and the thermistor may be placed on the solder layer and the solder layer reflowed to achieve an increased (or controlled) solder thickness. An increase in solder thickness may increase the thermistor reliability. The modification of the solder layer and the terminal electrode of the thermistor may improve thermistor reliability performance during thermal shock testing.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising an inverter configured to convert DC power from a battery to AC power to drive a motor, wherein the inverter includes:

a power module, the power module including a thermistor assembly, the thermistor assembly including:

a conductive layer including a trench;

a thermistor connected to the conductive layer and disposed across the trench; and a first height control feature between the conductive layer and the thermistor.

2. The system of claim 1, wherein the thermistor assembly further comprises:

a solder layer between the conductive layer and the thermistor.

3. The system of claim 2, wherein the conductive layer includes copper and the solder layer includes one or more of a solder paste or a solder preform.

4. The system of claim 2, wherein the solder layer is printed on the conductive layer.

5. The system of claim 1, wherein the thermistor assembly further comprises:

a trench filling material in the trench.

6. The system of claim 5, wherein the first height control feature and the trench filling material include a same material.

7. The system of claim 1, wherein the first height control feature has a rounded shape.

8. The system of claim 1, wherein the first height control feature has a rectangle shape.

9. The system of claim 1, wherein the thermistor assembly further comprises:

a second height control feature between the conductive layer and the thermistor.

10. The system of claim 9, wherein the first height control feature and the second height control feature are a same size.

11. The system of claim 1, further comprising:

the battery configured to supply the DC power to the inverter; and the motor configured to receive the AC power from the inverter to drive the motor, wherein the system is provided as a vehicle including the inverter, the battery, and the motor.

12. A system comprising a thermistor assembly, the thermistor assembly including:

a conductive layer including a trench;

a thermistor connected to the conductive layer and disposed across the trench; and a height control feature between the conductive layer and the thermistor.

13. The thermistor assembly of claim 12, further comprising:

a solder layer between the conductive layer and the thermistor, wherein the height control feature is configured to maintain a distance between the conductive layer and the thermistor and thereby maintain a thickness of the solder layer.

14. The thermistor assembly of claim 13, further comprising:

a trench filling material disposed in the trench to prevent the solder layer from flowing into the trench.

15. The thermistor assembly of claim 14, further comprising:

an underfill material between the trench filling material in the trench and the thermistor.

16. A system comprising:

a conductive layer having a first portion separated from a second portion;

one or more first height control features disposed on the first portion of the conductive layer;

one or more second height control features disposed on the second portion of the conductive layer; and an electrical component having a first portion disposed on the one or more first height control features and a second portion disposed on the one or more second height control features.

17. The system of claim 16, further comprising:

a solder material between the first portion of the conductive layer and the first portion of the electrical component.

18. The system of claim 16, wherein the first portion of the electrical component and the second portion of the electrical component are separated by a trench.

19. The system of claim 16, further comprising:

a trench filling material between the first portion of the electrical component and the second portion of the electrical component.

20. The system of claim 19, further comprising:

an insulating layer, wherein the trench filling material is disposed on the insulating layer.

* * * * *